United States Patent [19]

Dragner et al.

[11] Patent Number: 5,795,932

[45] Date of Patent: Aug. 18, 1998

[54] SURFACE SIZING COMPOSITION

[75] Inventors: Louis R. Dragner, Rock Hill; Douglas W. Harper, Columbia; Nolan H. Thompson, Rock Hill, all of S.C.

[73] Assignee: Sequa Chemicals, Inc., Chester, S.C.

[21] Appl. No.: 399,894

[22] Filed: Mar. 7, 1995

Related U.S. Application Data

[63] Continuation of Ser. No. 101,459, Aug. 2, 1993, abandoned, which is a continuation-in-part of Ser. No. 910,208, Jul. 8, 1992, abandoned.

[51] Int. Cl.[6] .................................................. C08L 91/06
[52] U.S. Cl. .................. 524/276; 524/275; 524/277; 524/475; 524/487; 427/391
[58] Field of Search .................... 524/276, 475, 524/275, 277, 487; 427/391

[56] References Cited

U.S. PATENT DOCUMENTS

| 2,391,620 | 12/1945 | Quarles et al. | 427/391 |
|---|---|---|---|
| 2,391,621 | 12/1945 | Powell, III et al. | 427/391 |
| 2,563,897 | 8/1951 | Wilson et al. | 162/166 |
| 2,676,934 | 4/1954 | Butler | 524/549 |
| 3,467,610 | 9/1969 | Fiarman et al. | 524/77 |
| 3,573,239 | 3/1971 | Zdanowski | 524/77 |
| 3,666,500 | 5/1972 | Lange et al. | 106/6 |
| 3,704,157 | 11/1972 | McDonald | 428/349 |
| 3,919,149 | 11/1975 | Cushman et al. | 524/111 |
| 4,017,431 | 4/1977 | Aldrich | 524/276 |
| 4,117,199 | 9/1978 | Gotoh et al. | 428/486 |
| 4,284,546 | 8/1981 | Delfosse et al. | 524/427 |
| 4,304,703 | 12/1981 | Das | 524/458 |
| 5,059,675 | 10/1991 | Carlin et al. | 528/254 |
| 5,120,355 | 6/1992 | Imai | 106/2 |
| 5,122,568 | 6/1992 | dePierne et al. | 524/824 |

FOREIGN PATENT DOCUMENTS

| 814528 | 6/1969 | Canada. |
| 3215895 | 11/1983 | Germany. |

*Primary Examiner*—Marion E. McCamish
*Assistant Examiner*—John J. Guariello
*Attorney, Agent, or Firm*—Mitchell D. Bittman

[57] ABSTRACT

A surface sizing composition is provided for nonwoven substrates comprising a hydrophobic waxy material and a surfactantless vinyl polymer or copolymer emulsion containing as the sole emulsifying agent an alkali soluble, acid containing copolymer.

21 Claims, No Drawings

SURFACE SIZING COMPOSITION

This application is a continuation of U.S. Ser. No. 08/101,459 filed Aug. 2, 1993, now abandoned, which is a continuation-in-part application of U.S. Ser. No. 07/910,208 filed Jul. 8, 1992, now abandoned.

BACKGROUND

This invention relates to the application of coatings to nonwoven substrates. More particularly, the invention relates to surface sizing compositions for nonwoven cellulosic substrates, such as paper and paperboard.

Surface treatment can be applied to paper as either a post production operation or as a portion of the papermaking process itself. Surface size is applied typically in the papermaking process after the paper sheet has been formed and dried but not passed through a calendar stack. The formed and dried sheet (web) is conducted through a size press (e.g. a nip-coater of various configurations) which re-wets the sheet to some degree (depending on the type of size press) with a starch solution, a starch/surface size solution, or a water/surface size solution. Upon the wetting or coating of the web, it is again dried and subsequently passed through a series of nips at the calendar to control caliper and smooth the finished sheet prior to wind-up and slitting or sheeting.

Surface treatment is applied by papermakers for a variety of reasons, all related in some way to obtain improved quality of the paper. Thus, starch is applied to the web to improve the sheet surface characteristics. Surface size treatment alters the paper or paperboard surface in that it usually imparts an increased degree of hydrophobicity, improving printability as well as other characteristics. A number of these treatments incorporate various waxes, see for example U.S. Pat. No. 4,117,199, but require the use of surfactants in preparing an emulsion. The use of conventional surfactants can be a disadvantage in sizing applications in that these surfactants have a tendency to re-wet the paper thus adversely affecting water resistance in the sized paper, as well as potentially being migratory on the sized paper, lowering wax efficiency and contributing to bath instability (phase separation). Other compositions mix a wax with a specific polymer, see for example U.S. Pat. Nos. 2,391,620 and 2,391,621, but prepare a solution in an organic solvent. The use of organic solvents is also considered to be a disadvantage because of handling, flammability and environmental concerns.

Still other sizing compositions disclose the use of various polymers as sizing agents, see for Example U.S. Pat. No. 5,122,568 which discloses the use of styrene-acrylic acid copolymers as surface sizing agents. However, using these polymeric sizing agents one does not obtain the beneficial water resistance of the paper surface that is obtained by using waxy materials.

SUMMARY OF THE INVENTION

Briefly, the present invention provides a surface sizing composition for nonwoven substrates, such as paper or paperboard, comprising a hydrophobic waxy material and a surfactantless aqueous vinyl polymer emulsion containing an alkali soluble, acid containing copolymer, also called an acid colloid, that acts as the emulsifier for both the vinyl polymer and the waxy material. The preferred surface sizing composition contains a styrene-acrylate ester copolymer, and as the waxy material, a stearylated melamine, and as the alkali soluble, acid containing copolymer, a styrene-acrylic acid copolymer. The preferred surface sizing composition is heated and mechanically homogenized to stabilize the final surface sizing composition as a finely divided dispersion.

DETAILED DESCRIPTION

The surface sizing composition of this invention utilizes a unique method of emulsifying a hydrophobic waxy material in an aqueous medium without the use of surfactants. The sizing composition provides a stable aqueous dispersion, conferring improved water resistance to the sized paper and paperboard, and mechanical stability at low concentration of the sizing composition in the warm aqueous pad bath, size press, or water box solutions.

The hydrophobic waxy material can be any one of a number of materials such as stearylated melamine; waxes, such as paraffin waxes, polyolefin waxes, Fischer-Tropsch waxes, oxidized polyethylene or polypropylene, carnauba wax, etc. and blends thereof. The preferred waxy material is stearylated melamine because enhanced sizing can be obtained, when it is emulsified with low or high levels of the acid containing copolymer, preferably applied in conjunction with a vinyl copolymer in emulsion form. The preferred stearylated melamine is a commercial product made by reacting hexamethoxy methylmelamine with stearyl alcohol. The ratio of stearyl alcohol to hexamethoxy methylmelamine is generally 2.5:1 to 5:1. One such commercially available stearylated melamine in solid form is, for example, Base-132 manufactured by Sequa Chemicals, Inc. of Chester, S.C. The hydrophobic waxy material is incorporated into the sizing composition in an amount generally within the range of 15% to 85% preferably 40% to 80% by dry weight of the total sizing composition.

The surface sizing composition of this invention utilizes alkali soluble, acid containing copolymer, preferably containing an acrylic acid to emulsify the hydrophobic waxy material instead of a conventional surfactant, such as nonionic, cationic or anionic compounds of low molecular weight. Examples of conventional surfactants are soaps, ethoxylated alkylphenols, sulfosuccinate compounds, sulfonated or phosphorated materials, and the like. Using an acrylic acid containing, alkali soluble copolymer as a macromolecular emulsifying agent without other surfactants enhances the sizing efficiency of the waxy hydrophobic material. In addition, the surface sizing composition has excellent compatibility with starch at size press temperatures (120° F. to 160° F.). Eliminating the use of conventional surfactants when preparing the surface sizing composition, avoids the problems normally associated with these conventional surfactant containing systems such as destabilization of the emulsion by migration of the conventional surfactant away from the emulsion particles, and re-wetting of the sized paper containing dried conventional surfactants on the surface. It is also often more difficult, when using certain conventional surfactants, to obtain stable surface sizing compounds when a vinyl polymer emulsion is included in the formulation.

The alkali soluble, acid containing copolymers are well known materials. They can be synthesized by a number of methods. The synthesis of especially useful alkali soluble, acid containing copolymers is described in Canadian Patent No. 814,528. Examples of alkali soluble, acid containing copolymers useful in this invention are: styrene-acrylic acid copolymers, styrene-methacrylic acid copolymers, styrene-acrylonitrile-acrylic acid copolymers, styrene-butyl acrylate-acrylic acid copolymers, and the like. Instead of styrene, other hydrophobic monomers may be contained in the acid containing copolymers, such as alpha-methylstyrene; alkyl substituted styrenes, such as vinyl toluene; acrylonitrile; vinyl chloride, acrylic- and methacrylic esters, such as butyl acrylate, methyl methacrylate, or ethyl methacrylate; or the like, or mixtures thereof; vinyl esters, such as vinyl acetate or vinyl laurate; fumarate esters, such as dibutyl fumarate; maleate esters, such as dibutyl maleate; itaconate esters, such as dibutyl itaconate; olefins, such as ethylene, and the like, or mixtures thereof. Instead of acrylic- or methacrylic acid, other copolymerizable, unsaturated acids may be used in the synthesis of the alkali soluble, acid containing copolymers. Examples are: crotonic acid; itaconic acid; monoalkyl maleates, such as monoethyl maleate; aconitic acid; and the like. Unsaturated sulfonic acids, such as vinyl sulfonic acid or styrene sulfonic acid and the like may also be used. The acid number of the alkali soluble, acid containing copolymers is at least 100 and generally from 100 to 400, preferably from 190 to 250. The weight average molecular weights are generally from 1,000 to 15,000, preferably from about 5,000 to 10,000. When a styrene-acrylic acid copolymer is used as the emulsifier in this invention the weight ratio of styrene to acrylic acid is generally from about 6:1 to about 1.5:1, preferably from about 5:1 to about 2.5:1. The alkali soluble, acid containing copolymer can be any of the commercially available products, such as Morez 101, sold by Morton Chemical Company, or Flexbond 25, sold by the Air Products Co., or Joncryl 67 sold by S.C. Johnson Company. Other commercially available alkali soluble, acid containing copolymers of above description and having properties similar to the ones mentioned above can also be used. Some of these commercial copolymers are available as aqueous solutions and can be used as such. If they are in a solid form they can be dissolved in an alkaline medium at elevated temperature. Alkali materials such as ammonium hydroxide, sodium hydroxide, potassium hydroxide, soda ash and the like, as well as water-soluble mono-, di- and trialkyl- or hydroxyalkyl amines, such as methyl or ethyl amine or monoethanol amine, may be employed to solubilize the alkali soluble, acid containing copolymer. In a preferred embodiment, the alkaline solution is comprised of a major amount by weight of ammonia. The pH of the solution of the alkali soluble, acid containing copolymer is generally about from 6 to 10, preferably from about 7.5 to 9. The aqueous alkali soluble, acid containing copolymer solution generally has a solids level of from 20 to 40%.

In a preferred embodiment a vinyl copolymer emulsion is first prepared using the alkali soluble, acid containing copolymer as the sole emulsifier, without the addition of conventional surfactants. The thus prepared vinyl copolymer emulsion is then utilized to emulsify the hydrophobic waxy material to prepare the sizing composition. Thus, the alkali soluble, acid containing copolymer is utilized first to stabilize the vinyl polymer emulsion and then, indirectly, utilized to stabilize the final sizing composition containing also the waxy material.

The vinyl copolymer emulsion is prepared conventionally using normal emulsion polymerization techniques. These are well known in the art. The alkali soluble, acid containing copolymer is first dissolved in alkaline water, then a vinyl monomer is added, either batchwise, semi-continuously or continuously, and emulsion polymerized using conventional initiators. For example, an alkali persulfate, such as sodium-, ammonium-, or potassium persulfate; as well as hydroperoxides, such as cumene hydroperoxide or t-butyl hydroperoxide; or hydrogen peroxide, or mixtures thereof, may be used. Redox systems containing above recited peroxides in conjunction with small amounts of ferrous ions and a redox agent, such as sodium formaldehyde sulfoxylate or ascorbic acid are also often used in emulsion polymerizations. The polymerization is performed at a temperature of about 30° C. to about 100° C. A wide range of monomers or monomer mixtures may be used to prepare the vinyl polymer or copolymer emulsion. Monomers, such as styrene, or derivative of styrene including alpha-methylstyrene, alkyl substituted styrenes, such as vinyl toluene, or halogen derivatives thereof; acrylonitrile; vinyl chloride, acrylic- and methacrylic esters, such as butyl acrylate, 2-ethylhexyl acrylate, methyl methacrylate, ethyl methacrylate, propyl methacrylate or butyl methacrylate, etcetera, or mixtures thereof; vinyl esters, such as vinyl acetate or vinyl laurate; fumarate esters, such as dibutyl fumarate; maleate esters, such as dibutyl maleate; itaconate esters, such as dibutyl itaconate; olefins, such as ethylene; the vinyl copolymer can also contain any of the typical multi-olefinically unsaturated crosslinking monomers, such as triallyl cyanurate, pentaerythritol tetraacrylate, trimethylol propane triacrylate, divinyl benzene, alone or in combination. The Tg of the vinyl polymer or copolymer is generally from about −50° C. to 110° C., preferably from −30° C. to 50° C., as calculated by the well known Fox equation. No conventional surfactants should be used in preparing the emulsion. The alkali soluble, acid containing copolymer is the sole emulsifier and protective colloid. The alkali soluble, acid containing copolymer is used in the amount of 10% to 50%, preferably in the amount of 20 to 40%, based on the weight of the monomers to prepare the vinyl polymer or copolymer emulsion. The particle size of the vinyl polymer or copolymer emulsion is generally from 50 to 300 nanometers, preferably from 65 to 110 nanometers. The viscosity of the vinyl polymer or copolymer emulsion is generally from 200 to 1500 centipoise, preferably from 400 to 1000 centipoise. The solids of the vinyl polymer or copolymer emulsion is generally from 40 to 60%, preferably from 45 to 50%. The pH of the vinyl polymer or copolymer emulsion is generally from 7 to 10, preferably from 8 to 9. The surfactantless aqueous vinyl polymer or copolymer emulsion is generally added at a level of 15% to 85%, preferably 20% to 60% by weight of the sizing composition. The surfactantless aqueous vinyl polymer or copolymer emulsion generally comprises 50% to 90%, preferably 60% to 80% by dry weight of the vinyl polymer or copolymer and 50% to 10%, preferably 40% to 20%, by dry weight of the alkali soluble, acid containing copolymer.

Generally, the surface sizing composition for nonwoven substrates comprises a mixture of:
a) 15 to 85% of a surfactantless aqueous vinyl polymer or copolymer emulsion wherein the sole emulsifying agent is an alkali soluble, acid containing copolymer; and
b) 85 to 15% of a hydrophobic waxy material that is emulsified by the alkali soluble, acid containing copolymer, when mixed and homogenized with the surfactantless aqueous vinyl polymer or copolymer emulsion.

In a preferred embodiment the vinyl polymer or copolymer emulsion contains a copolymer of styrene and an acrylate- or methacrylate ester preferably a styrene-2-ethylhexyl acrylate copolymer and as an emulsifier, a styrene-acrylic acid copolymer. The monomer weight ratio of styrene to acrylate- or methacrylate ester in the preferred vinyl copolymer emulsion is about 0.5:1 to 2.5:1, preferably 1.5:1 to 4:1 denoting a Tg of the vinyl polymer of −50° C. to 40° C., preferably from −10° C. to 35° C. as calculated by the Fox equation.

The sizing composition is prepared by mixing the hydrophobic waxy material and the alkali soluble, acid containing copolymer and the surfactant free vinyl polymer or copolymer emulsion. as the case may be. together. preferably heating the waxy material to 75° to 95° C. to melt it and adding it with agitation to the other ingredients. then homogenizing the mixture mechanically with a homogenizer or other mechanical means to decrease the overall particle size and stabilize the blend. Generally. the pH of the sizing composition will be alkaline. preferably at a pH of 7–10 to maintain the alkali soluble. acid containing copolymer in solution. Advantageously. high solids levels of the sizing composition can be achieved of up to about 60%. preferably 30% to 50%.

The following examples are set forth for the purposes of illustrating the invention and are not to be construed as limitations except as set forth in the appended claims.

EXAMPLE I

A vinyl copolymer emulsion was prepared as follows: A reactor charge of 703.5 grams of water. 0.4 gram of a 10% ferrous sulfate solution and 70.1 grams of a 20% aqueous ammonia solution was added to a laboratory reactor equipped with a stirrer. thermometer. heating and cooling means. addition funnels and a nitrogen inlet tube. 258 grams of a commercially available styrene-acrylic acid copolymer (Morez 101S. obtained from Morton Chemical Company was used having an acid number of 220 to 230 and an average molecular weight of 6,000 to 7,000) was added and dissolved by heating the mixture to 65° C. and holding for 60 minutes. An initial monomer charge of 22.1 grams of styrene. 0.1 grams of divinyl benzene (55%). and 12 grams of 2-ethylhexyl acrylate was then added. The polymerization was initiated at 80° C. by adding 4.1 grams of ammonium persulfate dissolved in 20.4 grams of water and 0.1 gram of ammonia (20%). After the temperature had reached 85° C., a monomer mixture of 377.4 grams of styrene. 2.1 grams of divinyl benzene (55%). and 204.5 grams of 2-ethylhexyl acrylate was then added over 2 hours. At the same time an initiator solution of 1 gram of ammonium persulfate dissolved in 98.9 grams of water and 3.5 grams of ammonia (20%) was also added over 2 hours. After the 2 hour monomer addition a final initiator solution of 1.3 grams of t-butyl hydroperoxide (70%) dissolved in 7.3 grams of water and 0.1 gram of ammonia (20%) was added. followed by a redox solution of 0.5 gram of sodium formaldehyde sulfoxylate dissolved in 7.3 grams of water and 0.1 gram of ammonia (20%). After cooling the solids content was measured to be 48.5%. the particle size was 77 nanometers. the pH was 8.5 and the viscosity of the emulsion was 650 cps. The calculated Tg was 5° C.

EXAMPLE II

A vinyl copolymer emulsion was prepared as follows:

A reactor charge of 690.7 grams of water. 0.4 gram of a 10% ferrous sulfate solution. 13.3 grams of a low molecular weight ethylene oxide-propylene oxide copolymer (Ethox L-121. obtained from Ethox Chemical Company was used). 32.5 grams of a low molecular weight ethylene oxide-propylene oxide copolymer ( Ethox L-122. obtained from Ethox Chemical Co. was used). and 80.7 grams of a 20% aqueous ammonia solution was added to a laboratory reactor equipped with a stirrer. thermometer. heating and cooling means. addition funnels and a nitrogen inlet tube. 242 grams of a commercially available styrene-acrylic acid copolymer (Flexbond 25. obtained from Air Products Co.. was used) was added and dissolved by heating the mixture to 65° C. and holding for 60 minutes. An initial monomer charge of 19.4 grams of styrene. 0.1 gram of divinyl benzene (55%). 3.8 grams of 2-ethylhexyl acrylate. and 8.7 grams of butyl acrylate was then added. The polymerization was initiated at 80° C. by adding 4.1 grams of ammonium persulfate dissolved in 19.1 grams of water and 0.5 gram of ammonia (20%). After the temperature had reached 85° C., a monomer mixture of 332.7 grams of styrene. 2.0 grams of divinyl benzene (55%). 63.7 grams of 2-ethylhexyl acrylate. and 149.3 grams of butyl acrylate was then added over 2 hours. At the same time an initiator solution of 1 gram of ammonium persulfate dissolved in 92.8 grams of water and 8.4 grams of ammonia (20%) was also added over 2 hours. After the 2 hour monomer addition a final initiator solution of 1.2 grams of t-butyl hydroperoxide (70%) dissolved in 6.8 grams of water and 0.5 gram of ammonia (20%) was added. followed by a redox solution of 0.5 gram of sodium formaldehyde sulfoxylate dissolved in 6.8 grams of water and 0.5 gram of ammonia (20%). After cooling the solids content was measured to be 48.5%. the particle size was 77 nanometers. the pH was 8.5 and the viscosity of the emulsion was 600 cps. The calculated Tg was 30° C.

EXAMPLE III

A typical sizing composition may be prepared by the following procedure. In a 2 liter glass resin flask equipped with a stirrer and thermometer. add 270 grams of water. 410 grams of a vinyl polymer or copolymer emulsion (the emulsion of Example I can be used) at a pH of 8.5 and 200 grams of stearylated melamine (Base-132. manufactured by Sequa Chemicals. Inc. of Chester. S.C. can be used). Heat the mixture to 75°–95° C.. hold for 15 minutes to insure all is melted then process through a preheated homogenizer. Recirculate through the homogenizer for 5 to 30 minutes at 500 to 9000 PSI. Discharge the homogenized product into 115 grams of 25° C. water. Cool the product down to 25° C. and adjust pH to 8.5 with aqueous ammonia. The finished product is a white homogenous. stable emulsion with 40.0% solids and Brookfield viscosity less than 100 cps.

EXAMPLE IV

The following sizing composition samples were prepared to demonstrate the invention:

Sample A

To 273 grams of water. 199 grams of stearylated melamine (Base-132. manufactured by Sequa Chemicals. Inc. of Chester, S.C. was used). and 411 grams of the emulsion of Example I were mixed and then heated to 90° C. The hot mixture was circulated through a homogenizer at 5000 PSI for 20 minutes, then diluted into 117 grams of cold water. The milky white stable emulsion had a pH of 8.5 and viscosity of 40 cps at 40% solids.

Sample B

To 378 grams of water, 299 grams of stearylated melamine (Base-132. manufactured by Sequa Chemicals. Inc. of Chester. S.C. was used). and 207 grams of the emulsion of Example I were heated to 85° C. Then the hot mixture was circulated through a hot homogenizer at 4000 PSI for 12 minutes. The emulsion was diluted with 117 grams of water. The milky white stable emulsion had a pH of 8.3 and a viscosity of 45 cps at 41% solids.

| Examples | Cobb w-f | HST w-f | Coef w-f |
|---|---|---|---|
| Sequapel® 403 | 18.5/18.4 | 213/195 | 16/17 |
| Sample A | 18.3/19.4 | 259/167 | 16/19 |
| Sample B | 17.4/18.3 | 325/237 | 14/18 |
| Styrene - maleic ester copolymer | 21.5/21.5 | 115/119 | 20/20 |
| Emulsion of Example I | 22.5/23.3 | 138/128 | 22/19 |

An unexpected improvement is observed where the sizing properties, particularly HST, for Samples A and B are greater than those of either component separately (i.e., the Sequapel® 403, an aqueous emulsified stearylated melamine from Sequa Chemicals, Inc. or the emulsion of Example I). The styrene-maleic ester copolymer (a commercially used sizing agent) was tested and showed inferior results in Cobb and HST.

The surface properties of treated paper requiring water resistance are evaluated by Cobb test, Hercules size test, and coefficient of friction test (Coef) methods. The Hercules size test (HST-2A) measures the penetration of a 1 percent formic acid dye solution read at 80% reflectance when the Hercules size solution penetrates through the sized paper or paperboard.

The Cobb test (TAPPI T441-om-90) is a TAPPI Standard test for the water absorptive properties of (non-bibulous) paper and paperboard and determines the sized substrate's water absorption in grams/square meter. The coefficient of static friction (T543-om-88) is a TAPPI method used to determine the change in slides angle after the surface size treatment of the paper substrate. When sizing chemical are added at the size press, the use limits are usually 2–8 dry pounds/ton of fiber. The sizing add-on level is kept low to prevent decreasing of the coefficient of friction to the point where sheeting and machine winding operations are adversely affected.

An alkaline substrate paper sized with the surfactantless sizing composition of this invention shows improved water resistance properties. The size press bath also has improved formulation stability at low percent solids and at high temperatures.

The surface sizing composition of the invention showed excellent starch compatibility with no increase in viscosity over a four (4) hour time period of the starch sizing composition mixture. The surfactantless sizing compositions of this invention improved both HST and Cobb values of alkaline or acid sized paper substrates.

EXAMPLE V

The following solutions were prepared to check compatibility with starch. The starch used was Penford Gum 280 (obtained from the Penford Co.), which is a hydroxyethylated cornstarch. The starch was cooked by adding 15 parts of starch to 85 parts of water, then heating to 190° F. and holding at that temperature for 30 minutes. The 8% solid baths were prepared using the formulas listed below:

|  | 1 | 2 | 3 | 4 | 5 | 6 |
|---|---|---|---|---|---|---|
| PG 280 (15% solution) | 214 | 214 | 214 | 214 | 214 | 214 |
| Sequapel® 403 |  | 16 |  |  |  |  |

| -continued | 1 | 2 | 3 | 4 | 5 | 6 |
|---|---|---|---|---|---|---|
| Sample A |  |  | 21.6 |  |  |  |
| Sample B |  |  |  | 19.5 |  |  |
| Emulsion of Example I |  |  |  |  | 16.4 |  |
| Blend 50/50 of Sequapel® 403 and Emulsion of Example I |  |  |  |  |  | 16.3 |
| Water | 286 | 270 | 264.4 | 266.5 | 269.4 | 269.7 |

The viscosity of each solution was measured on a Brookfield RVF using spindle #2 at two different speeds (20 RPM and 100 RPM) at 120° F. The viscosity was measured initially and after being placed in a constant temperature bath for 14 hours at 120° F. recorded below:

|  | Viscosities in cps | | | | | |
|---|---|---|---|---|---|---|
| Solution No: | 1 | 2 | 3 | 4 | 5 | 6 |
| Initial | | | | | | |
| 20 rpm | 5 | 65 | 6 | 6 | 4 | 8 |
| 100 rpm | 42 | 62 | 40 | 42 | 34 | 52 |
| 14 hours later | | | | | | |
| 20 rpm | 4 | 80 | 6 | 6 | 4 | 10 |
| 100 rpm | 38 | 120 | 42 | 46 | 34 | 56 |

Solution #2 and #6 had a white precipitate floating on the surface after being in the constant temperature bath. The other solutions were all fluid and had no particles present. The solution with Sequapel® 403 (Solution #2) had the highest initial viscosity and after fourteen hours it still had the highest viscosity with a significant change in that viscosity. The rise in viscosity and the white precipitate show the instability of the system. The solutions #3 and #4 did not exhibit any real change over the fourteen hours. Solution #5 is the vinyl copolymer sample and it does not exhibit a change in viscosity either. The solution where the vinyl copolymer of Example I and the pre-emulsified stearylated melamine (Sequapel® 403) were mixed (solution #6), had a white precipitate in it even though it did not show a significant increase in viscosity, showing its instability.

EXAMPLE VI

The following surface sizing compositions were prepared as specified in Example III:

|  | Sizing Compositions | | | | |
|---|---|---|---|---|---|
| Materials | 1 | 2 | 3 | 4 | 5 |
| Sequapel® 403 | — | — | — | — | 1000 |
| Paraffin Wax | 300 | 200 | 150 | 100 | — |
| Base-132 | — | — | 150 | 100 | — |
| Emulsion of Example I | 209 | 417 | 209 | 417 | — |
| Water | 491 | 383 | 491 | 383 | — |
| Solids (%) | 40 | 40 | 40 | 40 | 50 |

All the above compositions were padded on alkaline paper after diluting to 2% solids with water which resulted in a 8 lbs./ton pick up level. The sheets were air dried then cured for 2 minutes in an oven at 250° F. The emulsified (with conventional surfactant) stearylated melamine (Sequapel® 403) of solution #5 is used as a control. The following table gives the test results:

|  | Sizing Compositions | | | | |
| --- | --- | --- | --- | --- | --- |
|  | 1 | 2 | 3 | 4 | 5 |
| HST | 288 | 213 | 229 | 213 | 155 |
| Cobb | 18.5 | 19.1 | 17.5 | 18.3 | 18.8 |
| Coef-slide angle | 19 | 18 | 19 | 18 | 18 |

These results demonstrate improved HST sizing properties with stearylated melamine even if diluted with paraffin wax (solutions #1–4). The control (solution #5) had very poor HST sizing properties.

EXAMPLE VII

To 273 grams of water, 199 grams of stearylated melamine (Base-132, manufactured by Sequa Chemicals, Inc. of Chester, S.C. was used), and 411 grams of the emulsion of Example II were mixed and then heated to 90° C. The hot mixture was circulated through a homogenizer at 5000 PSI. After a few minutes the emulsion solids coagulated. A stable dispersion of the sizing composition could not be made. These results show that a vinyl copolymer emulsion (Example II) containing surfactants in addition to the alkali soluble, acid containing copolymer could not be combined with the stearylated melamine using identical homogenization procedures.

What is claimed:

1. A surfactantless surface sizing composition for nonwoven substrates comprising a mixture of:
   a) 15% to 85% by dry weight of the sizing composition of a surfactantless aqueous vinyl polymer or copolymer emulsion containing as the sole emulsifying agent an alkali soluble, acid containing copolymer having a weight average molecular weight of from 5,000 to 15,000; and
   b) 85% to 15% by dry weight of the sizing composition of a hydrophobic waxy material that is emulsified by said alkali soluble, acid containing copolymer, and which is mixed with said surfactantless aqueous vinyl polymer or copolymer emulsion.

2. The surface sizing composition of claim 1 wherein the surfactantless aqueous vinyl polymer or copolymer emulsion comprises from 50% to 90% by weight of the vinyl polymer or copolymer and 50% to 10% by weight of the alkali soluble, acid containing copolymer.

3. The surface sizing composition of claim 2 wherein the alkali soluble, acid containing copolymer has an acid number of at least 100.

4. The surface sizing composition of claim 3 wherein the alkali soluble, acid containing copolymer is copolymer of styrene and acrylic acid having a monomer ratio from 6:1 to 1.5:1.

5. The surface sizing composition of claim 4 wherein the vinyl polymer or copolymer is a copolymer of styrene and an acrylate- or methacrylate ester having a monomer ratio from 0.5:1 to 2.5:1, and the copolymer having a Tg from −50° C. to 40° C.

6. The surface sizing composition of claim 5 wherein the monomers of the styrene acrylate- or methacrylate ester copolymer emulsion are polymerized in an emulsion stabilized only by the styrene-acrylic acid copolymer.

7. The surface sizing composition of claim 5 wherein the acrylate- or methacrylate ester is 2-ethylhexyl acrylate.

8. The surface sizing composition of claim 4 wherein the vinyl polymer or copolymer is a copolymer of a monomer selected from the group consisting of styrene, divinyl benzene, alpha methyl styrene and mixtures thereof with an acrylate ester.

9. The surface sizing composition of claim 8 wherein the monomers of the styrene-acrylate ester copolymer are polymerized with a crosslinking monomer.

10. The surface sizing composition of claim 1 wherein the hydrophobic waxy material is selected from the group consisting of paraffin, stearylated melamine, oxidized polyethylene, oxidized polypropylene, Fischer-Tropsch waxes, carnauba wax and blends thereof.

11. The surface sizing composition of claim 6 wherein the hydrophobic waxy material is a stearylated melamine.

12. The surface sizing composition of claim 11 wherein the stearylated melamine is the reaction product of stearyl alcohol with hexamethoxy methylmelamine.

13. The surface sizing composition of claim 1 wherein the solids level of the surface sizing composition is from 30% to 50%.

14. The surface sizing composition of claim 1 wherein the mixture is heated and homogenized to stabilize the emulsion.

15. The surface sizing composition of claim 1 wherein the nonwoven substrate is paper or paperboard.

16. Composition of claim 1 wherein the sizing composition has a pH of 7 to 10.

17. Composition of claim 3 wherein the hydrophobic waxy material comprises 40% to 80% by dry weight of the total sizing composition.

18. Composition of claim 17 wherein the sizing composition comprises 20% to 60% by dry weight of the aqueous surfactantless vinyl polymer or copolymer emulsion in which the vinyl polymer or copolymer emulsion comprises 60% to 80% by weight of the vinyl polymer or copolymer and 40% to 20% by weight of the alkali soluble, acid containing copolymer.

19. Process of sizing a nonwoven substrate comprising coating the substrate with the surface sizing composition of claim 1, following by drying the coated substrate.

20. Process of sizing a nonwoven substrate comprising coating the substrate with the surface sizing composition of claim 5, followed by drying the coated substrate.

21. Surface sizing composition of claim 2 wherein the alkali soluble, acid containing copolymer has a weight average molecular weight of from 5,000 to 10,000.

* * * * *